(12) United States Patent
Malchev et al.

(10) Patent No.: US 9,068,622 B2
(45) Date of Patent: Jun. 30, 2015

(54) SHOCK-ISOLATION STRUCTURE

(75) Inventors: Delyan Malchev, Ulm (DE); Hermann-Josef Veerkamp, Dornstadt (DE)

(73) Assignee: EADS Deutschland GmbH, Ottobrunn (DE)

( * ) Notice: Subject to any disclaimer, the term of this patent is extended or adjusted under 35 U.S.C. 154(b) by 187 days.

(21) Appl. No.: 13/510,707

(22) PCT Filed: Oct. 23, 2010

(86) PCT No.: PCT/EP2010/006492
§ 371 (c)(1),
(2), (4) Date: Jun. 20, 2012

(87) PCT Pub. No.: WO2011/060868
PCT Pub. Date: May 26, 2011

(65) Prior Publication Data
US 2012/0248282 A1 Oct. 4, 2012

(30) Foreign Application Priority Data

Nov. 20, 2009 (EP) .................................... 09014482

(51) Int. Cl.
*F16M 13/00* (2006.01)
*F16F 9/53* (2006.01)
*F16F 15/027* (2006.01)

(52) U.S. Cl.
CPC ................. *F16F 9/53* (2013.01); *F16F 15/027* (2013.01)

(58) Field of Classification Search
CPC ............................... F16F 15/022; B60G 17/08
USPC .................. 248/550, 636; 74/490.06; 29/714
See application file for complete search history.

(56) References Cited

U.S. PATENT DOCUMENTS

| | | | | | |
|---|---|---|---|---|---|
| 3,288,421 | A | * | 11/1966 | Peterson | 248/396 |
| 3,577,659 | A | * | 5/1971 | Kail | 434/58 |
| 4,892,051 | A | | 1/1990 | Taylor et al. | |
| 5,489,168 | A | * | 2/1996 | Sheldon et al. | 409/235 |
| 5,568,993 | A | * | 10/1996 | Potzick | 403/128 |
| 5,829,982 | A | * | 11/1998 | Advani et al. | 434/58 |
| 5,870,834 | A | * | 2/1999 | Sheldon | 33/556 |
| 5,975,907 | A | * | 11/1999 | Advani | 434/29 |
| 6,021,579 | A | * | 2/2000 | Schimmels et al. | 33/645 |

(Continued)

FOREIGN PATENT DOCUMENTS

JP 2006-273221 A 10/2006

OTHER PUBLICATIONS

European Search Report dated Feb. 22, 2010 (Four (4) pages).

(Continued)

*Primary Examiner* — Terrell McKinnon
*Assistant Examiner* — Daniel Breslin
(74) *Attorney, Agent, or Firm* — Crowell & Moring LLP

(57) ABSTRACT

A shock isolation structure for mounting a radar system to a supporting surface on board of a vessel includes a platform on which the radar system can be attached, six strut-like damping elements operating in both tension and compression between the platform and the supporting surface. The damping elements are oriented in a truss configuration with first ends of the damping elements connected to the supporting surface for universal movement and with second ends of the damping elements connected to the platform for universal movement. Each of the damping elements includes a magnetorheological or electrorheological fluid damper.

3 Claims, 3 Drawing Sheets

(56) References Cited

U.S. PATENT DOCUMENTS

| | | | |
|---|---|---|---|
| 6,223,604 B1 * | 5/2001 | Fronczak et al. | 73/856 |
| 6,330,837 B1 * | 12/2001 | Charles et al. | 74/490.06 |
| 6,425,177 B1 * | 7/2002 | Akeel | 29/714 |
| 6,468,082 B1 * | 10/2002 | Denne | 434/55 |
| 6,474,915 B1 * | 11/2002 | Wildenberg | 409/201 |
| 6,640,941 B2 * | 11/2003 | Taylor | 188/314 |
| 6,752,250 B2 | 6/2004 | Tanner | |
| 7,029,059 B2 * | 4/2006 | Bernhardt et al. | 296/190.07 |
| 7,040,033 B2 * | 5/2006 | Zhu et al. | 33/502 |
| 7,185,855 B2 * | 3/2007 | Peck | 244/165 |
| 7,358,498 B2 * | 4/2008 | Geng et al. | 250/347 |
| 7,806,697 B2 * | 10/2010 | Mallaci et al. | 434/372 |
| 8,505,392 B2 * | 8/2013 | Zhang et al. | 73/862.043 |
| 2002/0029610 A1 * | 3/2002 | Chrystall et al. | 73/7 |
| 2003/0057618 A1 | 3/2003 | Tanner | |
| 2003/0075407 A1 | 4/2003 | Taylor | |
| 2003/0106230 A1 * | 6/2003 | Hennessey | 33/645 |
| 2003/0168295 A1 | 9/2003 | Han et al. | |
| 2004/0124049 A1 * | 7/2004 | St. Clair et al. | 188/266 |
| 2011/0308296 A1 * | 12/2011 | Sasso et al. | 73/1.77 |

OTHER PUBLICATIONS

International Search Report dated Dec. 20, 2010 (Two (2) pages).
English translation of International Preliminary Report on Patentability dated May 31, 2012 (six (6) pages).

* cited by examiner

Variant 1

Variant 2

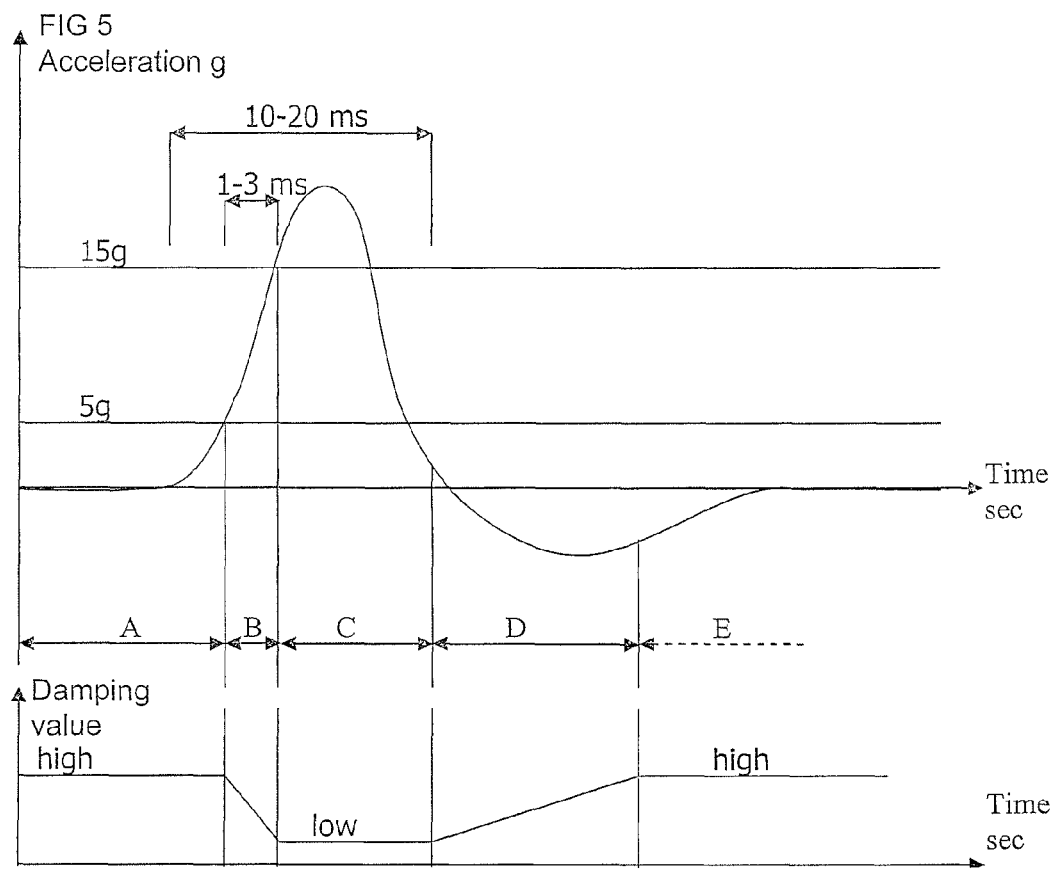

SHOCK-ISOLATION STRUCTURE

FIELD OF THE INVENTION

The present invention relates generally to shock-isolation systems used to support and protect sensitive equipment. More specifically, the invention is related to the protection of radar systems installed on a vessel against shock and vibration.

BACKGROUND OF THE INVENTION

In order to prevent delicate state-of-the-art electronic equipment onboard naval vessels from failure caused by adverse shock and vibration, shock and vibration isolation techniques have to be applied.

Specifically, modern electronically scanned radar systems (AESA) have very high requirements regarding platform stability in order to operate accurately. A relative movement between radar system and platform must be generally avoided and only a very small rotation deviation is tolerable.

A shock-isolation platform suitable for radar systems installed on vessels must therefore offer almost rigid behavior when subjected to accelerations up to 5 g but should act as a shock absorber when the load exceeds 5 g.

Typical and well-known damping means for such platforms are helical springs or wire rope isolators. However, this method does not ensure enough stability during normal naval vessel operation, resulting in rotatory motion of the system.

U.S. Patent Application Publication No. 2003/0075407A1 discloses a so-called Stewart platform for shock isolation of sensitive equipment on a vessel. The proposed shock-isolation platform is based on helical springs that do not have the needed damping properties outlined above for the protection of a radar system used on a vessel. The disclosed Stewart platform is not sufficiently stiff to ensure stability for the radar system to operate. Using this type of isolation structure requires a fixed predefinition of the spring rate. If a stiff spring is chosen, the platform will be stable when loaded up to 5 g, but in case of underwater detonation the acceleration will be transmitted and will damage electronic equipment. On the other hand, if one chooses soft springs, the platform will withstand an underwater detonation, but the radar will not be able to operate during ship motion because of insufficient stability and stiffness of the isolation structure.

Electrorheological or magnetorheological fluid (hereinafter designated as ERF and MRF, respectively) damping elements for a shock-isolation structure on a vessel are discussed in U.S. Pat. No. 6,752,250 B2. However, the very simple mounting principle does not meet the constructive requirements of a naval radar. The disclosed system acts mainly in one axis, making it impossible to fix a complex radar system to it.

As can be easily seen, the disclosed isolating structure can be exposed only to vertical shock. Due to the joints employed in the system, the system does not have any stiffness in horizontal direction, making it unsuitable for use on naval vessels. A further disadvantage of the disclosed structure is the complex control of its damping properties. Usually MRF or ERF damping elements have soft damping properties and the stiffness is increased only when needed. According to the requirements associated with a naval radar system, however, exactly the opposite is needed, i.e., the damping elements are permanently under high voltage to ensure very high stiffness. The stiffness is decreased only when a specific event occurs (shock, detonation etc.). The mentioned disadvantages render the structure disclosed in U.S. Pat. No. 6,752,250 B2 unsuitable for the protection of a naval radar contemplated by this invention.

SUMMARY OF THE INVENTION

Exemplary embodiments of the present invention provide a shock isolation platform ensuring a high repositioning accuracy for naval radar systems.

According to the present invention the shock-isolation structure is designed according to the principles of a Stewart platform. This structure is able to absorb shocks in all earth directions. Its strut-like damping elements use ERF or MRF dampers. The damping properties of the ERF or MRF dampers can be electronically controlled. Adjustment can take place within a few milliseconds.

The structure according to the invention provides protection of the radar system against any shock or vibration forces and ensures that during vessel operation the radar system can operate without any restrictions.

BRIEF DESCRIPTION OF THE DRAWINGS

FIG. 5 shows the application principle of the shock-isolation structure.

DETAILED DESCRIPTION THE INVENTION

Figure 1:
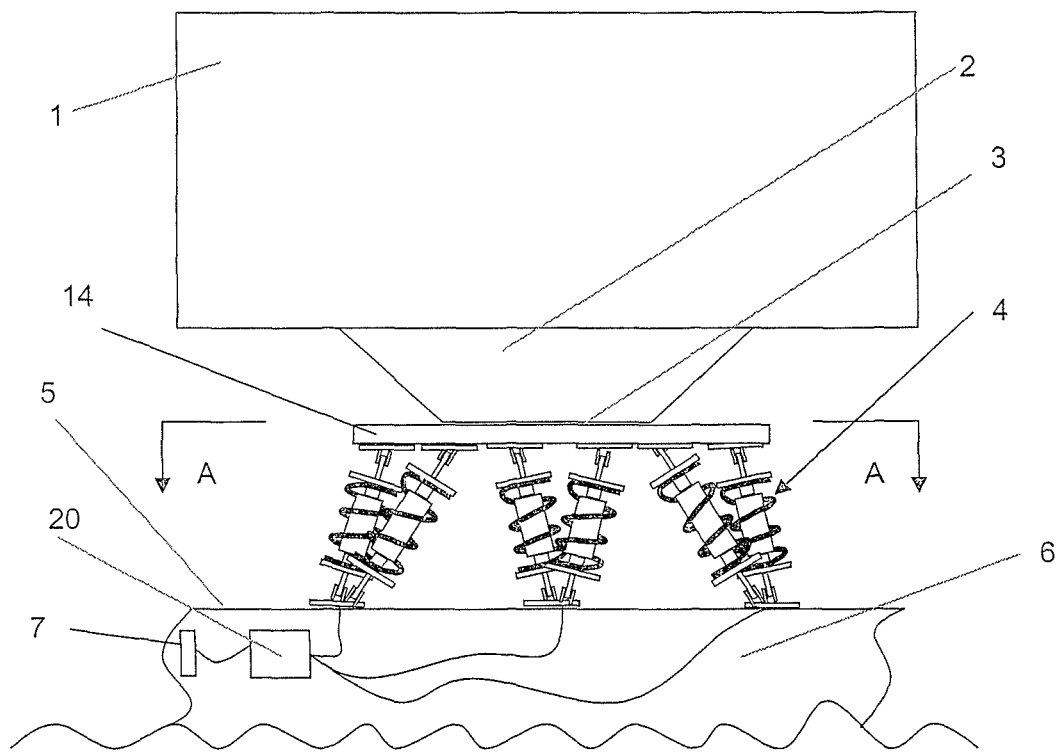
FIG. 1 is a side view of a first embodiment of the shock-isolating structure according to the invention.
Figure 3:
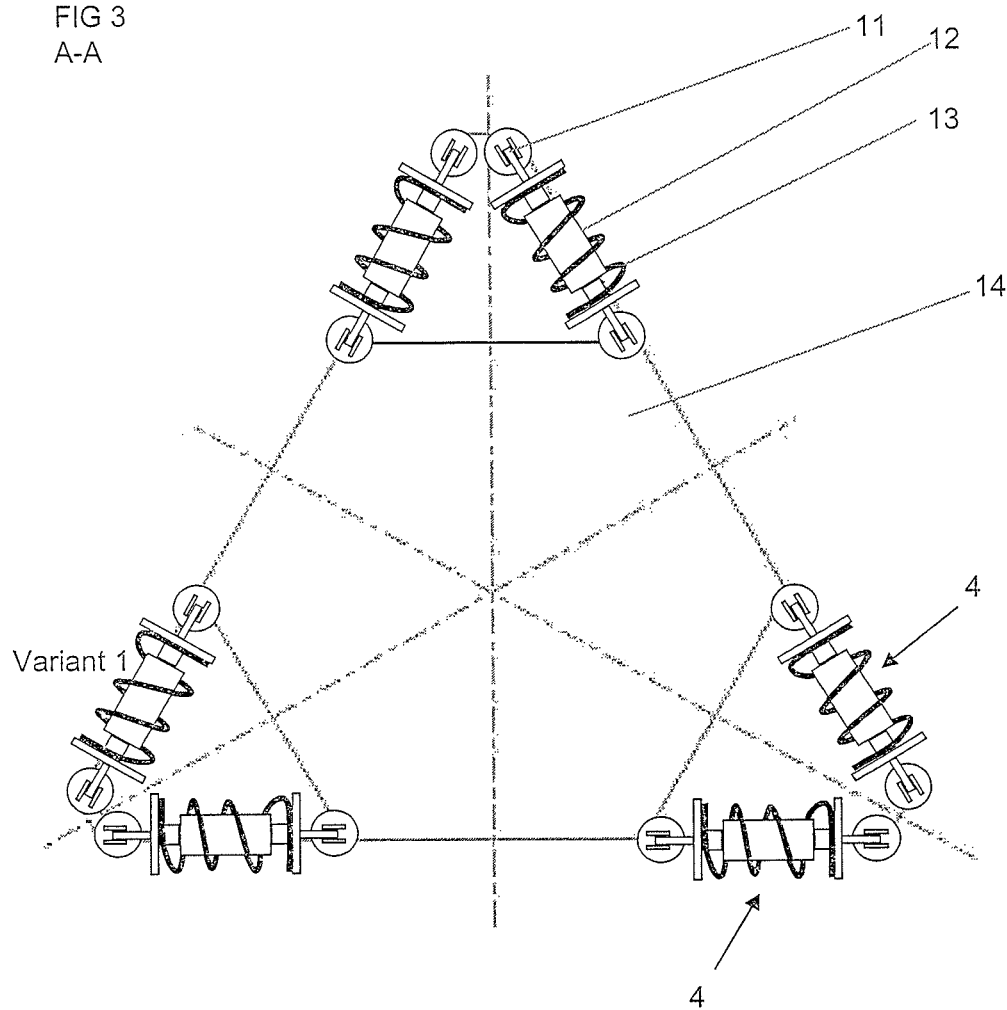
FIG. 3 is a top view of the shock-isolation structure, according to section view A-A of FIG. 1.

A first embodiment of the shock-isolation structure according to the invention is shown in FIGS. 1 and 3 installed on board of a vessel 6.

In the side view of FIG. 1 the radar system 1 with radar rotating unit 2 and radar interface plate 3 are mounted on a platform 14. The platform 14 and the deck 5 of the vessel 6 are connected by six strut-like damping elements 4 that operate both in tension and compression between deck 5 and platform 14. The six damping elements are arranged in a truss configuration according to the principles of a Stewart platform. As can be seen from FIG. 3 the six damping elements 4 form three pairs with each pair oriented in a V-configuration.

Figure 2:
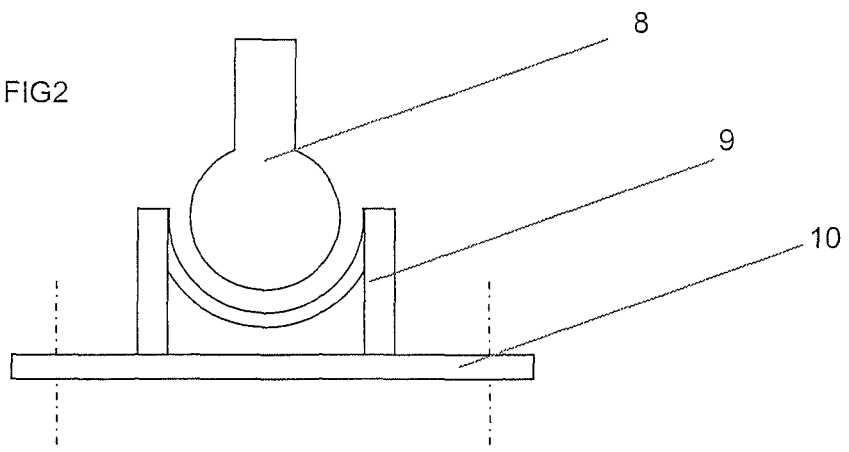
FIG. 2 shows a ball joint at the ends of each strut-like damping element.

Each end of damping element 4 is connected to platform 14 or deck 5 allowing universal movement in all directions. This can be achieved, for example, by a standard ball joint as shown in detail in FIG. 2 with a spherical end part 8 of a damping element 4 moving in a casing 9 that is mounted on an interface plate to the deck 5 or to the platform 14. In general, any connection that permits angular rotation about a central point in two orthogonal directions can be used.

Each damping element 4 comprises an MRF or ERF damper 12. In addition, each of the damping elements 4 includes a helical spring 13. Instead of a helical spring any other type of spring can be used, e.g., fluid or gas springs. The main purpose of the spring 13 is to dissipate the energy of the shock by transforming it into displacement. According to the type of springs used, the shock energy could also be transformed into friction, heat etc.

The operative characteristics of MRF and ERF damper are known in the art. A MRF damper is a damper filled with magnetorheological fluid, which is controlled by a magnetic field, usually using an electromagnet. This allows the damping characteristics of the shock absorber to be continuously controlled by varying the power of the electromagnet. Similarly, an ERF damper is a damper filled with electrorheological fluid, which is controlled by an electric field.

Figure 4:
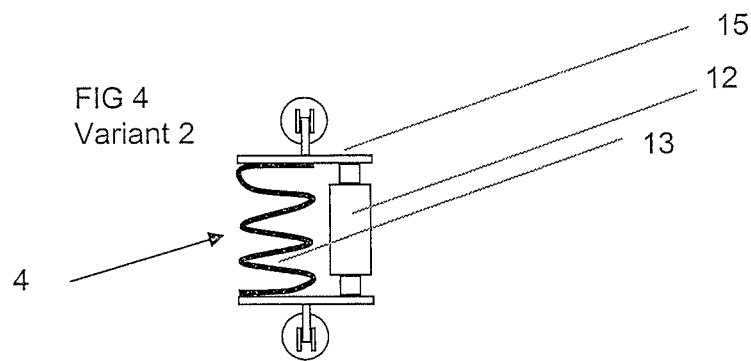
FIG. 4 shows an alternative embodiment of a damping element of the shock-isolating structure.

According to the embodiment shown in FIGS. 1 and 3, the MRF or ERF damper 12 is arranged inside the helical spring 13. In an alternative embodiment shown in FIG. 4 the MRF or ERF damper 12 is arranged outside the helical spring 13 with their longitudinal axis' oriented in parallel relationship. In both embodiments spring 13 and damper 12 are arranged between two parallel plates 15 connected to the joints.

If the stiffness of the structure described above is not sufficient for shock isolation under certain operational circumstances, two or more of these structures can be used for complex support of the radar system. For example, in one specific embodiment one could attach two of these structures at opposite sides of the radar system.

The control algorithm for the damping properties of the MRF and ERF dampers will now be described in further detail and with reference to FIG. 5, which shows the acceleration load over time during a shock. As indicated in FIG. 5 the typical duration of such a shock is in the range of 10 to 20 ms. Also shown are the respective damping values of the structure. The duration of the shock can be subdivided into five distinctive periods A to E.

In order to monitor the acceleration load on the ship, and in turn on the radar system, an accelerometer 7 (FIG. 1) is arranged on the hull (or deck) of the naval vessel and connected to a damper controller. As long as no load exceeding 5 g is detected, the ERF or MRF dampers are substantially stiff, i.e., the damping value is very high, and no relative motion between vessel and radar system is permitted. The very large damping values are preventing the damping elements from moving and the loads can be transmitted 1:1. The radar system is able to operate properly (period A).

Typically, electronic components are capable of withstanding up to 15 g without suffering any damage. If the accelerometers detect accelerations beyond 5 g (period B), an electrical signal is sent to the ERF (MRF) damper 12 by the damper controller 20. As a result the damping value of the damper as well as the damping value of the overall structure decreases to achieve a minimum value before the acceleration reaches the 15 g limit. The reaction time should be kept as short as possible. The typical time span until the minimum damping value is achieved is in the range of 1 to 3 ms but with existing ERF or MRF dampers even a reaction time of less than 0.3 ms is possible.

During the following period C the shock load exceeds 15 g. System damping has already been adjusted to very soft properties and the damper element 4 is able to absorb the shock energy, transforming it into displacement or heat. Hence, the damage of the electronic equipment can be avoided.

Period D: After the maximum value of the acceleration has been reached, the structure is swinging with very low damping. The damping properties of the system are now increased again in order to accelerate the elimination of the swinging motion of the structure. The rate of change of the damping value (i.e. the slope of the graph of the damping value in period D) can be adjusted accordingly.

About 3-15 seconds after the defection of the shock the damping is automatically increased to its maximum value before the structure returns to its initial stiff position (period E).

The energy dissipation of the springs ensures that a long-lasting swinging motion of the structure at very small amplitudes is avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A shock isolation structure for mounting a radar system to a supporting surface on board of a vessel, comprising:
    a platform configured for attachment to the radar system
    six strut-like damping elements operating in both tension and compression between the platform and the supporting surface; and
    a damper controller operatively connected to each of the damping elements,
    wherein said damping elements are oriented in a truss configuration with first ends of said damping elements connected to said supporting surface via first universal joints and with second ends of said damping elements connected to said platform via second universal joints,
    wherein each of said damping elements comprises a magnetor-heological or electrorheological fluid damper, and
    wherein the damper controller is configured to control stiffness of each of the damping elements based on an acceleration load acting on the radar system.

2. The shock isolation structure according to claim 1, wherein each of said damping elements comprises a spring arranged in parallel to the magnetorheological or electrorheological fluid damper.

3. The shock isolation structure according to claim 1, wherein the damper controller is configured so that said magnetorheological or electrorheological fluid damper is rigid when subjected to accelerations up to 5 g and non-rigid when subjected to accelerations exceeding 5 g.

* * * * *